(12) United States Patent
Moshovos et al.

(10) Patent No.: US 6,658,554 B1
(45) Date of Patent: Dec. 2, 2003

(54) ELECTRONIC PROCESSOR PROVIDING DIRECT DATA TRANSFER BETWEEN LINKED DATA CONSUMING INSTRUCTIONS

(76) Inventors: Andreas I. Moshovos, 1226 Elmwood Ave., #3E, Evanston, IL (US) 60202; Gurindar S. Sohi, 4617 Gregg Rd., Madison, WI (US) 53706

( * ) Notice: Subject to any disclaimer, the term of this patent is extended or adjusted under 35 U.S.C. 154(b) by 0 days.

(21) Appl. No.: 09/418,522

(22) Filed: Oct. 14, 1999

Related U.S. Application Data (60) Provisional application No. 60/123,411, filed on Mar. 9, 1999.

(51) Int. Cl.[7] ............................................. G06F 9/30
(52) U.S. Cl. .................. 712/216; 712/205; 711/147
(58) Field of Search ................. 712/218, 217, 712/219, 216; 709/310, 312

(56) References Cited

U.S. PATENT DOCUMENTS

| | | | | |
|---|---|---|---|---|
| 5,666,506 A | * | 9/1997 | Hesson et al. ............... | 712/216 |
| 5,737,636 A | * | 4/1998 | Caffo et al. .................... | 710/53 |
| 5,898,853 A | * | 4/1999 | Panwar et al. ............... | 712/216 |
| 6,148,394 A | * | 11/2000 | Tung et al. .................. | 712/218 |
| 6,240,509 B1 | * | 5/2001 | Akkary ........................ | 711/207 |
| 6,360,314 B1 | * | 3/2002 | Webb et al. ................. | 712/206 |

OTHER PUBLICATIONS

A. Moshovos and G. Sohi, "Streamlining Inter–operation Memory Communication via Data Dependence Prediction," 11 pgs., *Proceedings of IEEE,* Dec. 1–3, 1997.

* cited by examiner

*Primary Examiner*—Todd Ingberg
*Assistant Examiner*—William H. Wood
(74) *Attorney, Agent, or Firm*—Quarles & Brady LLP (57) ABSTRACT

A data dependence prediction technique is used to establish linkage between two instructions using data so that accessing the data from memory may be bypassed. Instead, the data retrieved in the first data using instruction is temporarily stored in a local register to be used by the second data using instruction. Parallel processing techniques of squashing are used in the event that the prediction is erroneous.

8 Claims, 5 Drawing Sheets

ELECTRONIC PROCESSOR PROVIDING DIRECT DATA TRANSFER BETWEEN LINKED DATA CONSUMING INSTRUCTIONS

CROSS-REFERENCE TO RELATED APPLICATIONS

This application is based on U.S. Provisional application 60/123,411 filed Mar. 9, 1999 and claims the benefit thereof and is hereby incorporated by reference.

STATEMENT REGARDING FEDERALLY SPONSORED RESEARCH OR DEVELOPMENT

This invention was made with United States government support awarded by the following agencies: DARPA Grant No.: DABT63-95-C-0127 and NSF Grant Nos.: CCR-9303030; MIP-9505853.

BACKGROUND OF THE INVENTION

The invention generally relates to architectures of electronic computers providing speculative execution.

In an electronic computer, a processing unit communicates with electronic memory holding data and program instructions. Typically, the processing unit executes the program instructions to load data from the memory, perform an operation on that data, and store the result of that operation back to the memory. During the operations, the data and result are temporarily held in registers internal to the processor. Registers are limited in number and cannot be practically used for long term storage of data.

The time required to load data from the memory and to store the data to the memory slows the speed of execution of the program. For this reason, it is known to construct cache memories which allow high bandwidth communication of limited amounts of data between the cache and processor. The cache is refreshed from the main memory as needed according to techniques well known in the art.

It is also known in the art to increase the speed of program execution by using multiple processing units to simultaneously execute instructions or to execute instructions in an order differing from normal program order. Computers using this technique are termed instruction level parallel ("ILP") processors as may be distinguished from systems in which independent programs may be assigned different processors, for example.

In an ILP processor, the processor fetches multiple instructions in an instruction "window" and an allocation circuit allocates those instructions to separate processing units. The separate processing units may read data from memory and perform arithmetic or logical operations on that data. A retirement circuit then collects the results generated by the independent processing units and "retires" the instructions executed by those processing units by writing final results to memory. The retirement circuitry resolves mis-speculation, that is, situations where instructions were executed out-of-order but were in fact dependent on an earlier instruction in the execution order and therefore may have produced an erroneous result.

There are two types of dependency between instructions that may cause mis-speculation. "Control dependency" is the dependency exhibited by instructions after conditional branch or jump instructions on how the branch or jump is resolved. Instructions immediately after a branch may correctly execute only if the branch is not taken. "Data dependency" is the dependency of later instructions that use data on earlier instructions that create the data. These later data-using instructions may correctly execute only if the earlier instructions creating the data do not change the data or have completed the change of data. A dependency is "unambiguous" if it necessarily produces an error when the dependent instruction is executed before the instruction on which it is dependent.

Control and data dependencies limit the ability of an ILP processor to execute normally sequential instructions simultaneously or out-of-order. If the dependency is unambiguous, the results of an out-of-order execution of a dependent instruction must be discarded ("squashed") and executed at later time (for data dependence) or other instructions executed instead (for control dependence). Squashing instructions is time wasting and to some extent defeats the advantages to be gained from parallel processing. In order to avoid the problems associated with squashing, the ILP processor can guess or "speculate" how any dependency will be resolved or whether it is relevant. This speculation need not be perfect, as it will ultimately be assessed by the retirement circuit, but it should be as accurate as possible. U.S. Pat. No. 5,781,752 issued Jul. 14, 1998 and entitled: Table Based Data Speculation Circuit for Parallel Processing Computer, assigned to the same assignee as the present invention and hereby incorporated by reference, discusses a method of determining likely data dependencies between given instructions in a program so that mis-speculation may be avoided.

BRIEF SUMMARY OF THE INVENTION

The present inventors have recognized that the mechanism of detecting data dependency disclosed in the above referenced pending application may be used to implicitly link data-consuming instructions that rely for their data on a common preceding instruction. In this way, time consuming memory transfers may be postponed or eliminated. Knowledge of data dependencies is used to pass data directly between instructions via special registers without waiting for the completion of memory LOADs. The same structure allows the identification of memory STORE operations which provide the data to the data consuming LOADs so that data may be passed directly from these STORE instructions.

Because the method of identifying data dependence is probabilistic, actual memory LOADs must be performed to confirm the predicted flow of data directly between instructions. However, in an ILP processor, data may be speculatively transferred between instructions to be squashed later if the speculation proves wrong according to standard ILP techniques.

Specifically, the invention provides a memory bypass circuit for use in an electronic processor executing data-producing instructions producing data to be stored into a memory and data-consuming instructions loading data from the memory. The memory bypass circuit includes a dependency table linking in "read-read" dependencies first data-consuming instructions to second data-consuming instruction according to a probability that both data consuming instructions read the same memory location. A storage register stores the data received by a first data consuming instruction identified to a read-read dependency of the dependency table. A table reviewing circuit, responsive to a second data-consuming instruction, reviews the dependency table and when the second data-consuming instruction is part of a read-read dependency with the first data consuming instruction, reads the data for that read-read dependency from the storage register.

Thus, it is one object of the invention to explicitly link data between two data-consuming instructions so as to provide a direct path of inter-instruction communication that bypasses standard memory and even cache memory. By establishing a direct inter-instruction communication pathway, the speed of communication is improved.

The dependency table may hold a prediction value associated with each read-read dependency and the table reviewing circuit may respond to the given data-consuming instruction, that is part of a dependency, by reading the data for that read-read dependency from the storage register only if the prediction value is above a predetermined threshold value. A dependency detection circuit detecting a data dependence between data consuming instructions generates the prediction value.

Thus, it is another object of the invention to provide for linkage of data-consuming instructions through the use of a probabilistic technique that examines after-the-fact detections of data dependence to predict future data dependencies. In this way no explicit linkage of the instructions need be done by the programmer and instructions whose dependence varies dynamically may be accommodated.

The dependency table may further link, in "read-write" dependencies, particular data-producing instructions to particular data-consuming instructions according to a probability that the data-producing instruction produces data used by the data-consuming instruction. In this case, the storage register further stores the data produced by the data-producing instruction identified to the read-write dependency of the dependency table and the table reviewing circuitry is responsive to a given data-consuming instruction to review the dependency table and when the given data-consuming instruction is part of a read-write dependency, reading the data for that dependency from the storage register.

Thus it is a further object of the invention to permit the same mechanism used for data flow in read-read dependencies to provide for direct data flow between data producing instruction linked by a read-write data dependency to data consuming instructions.

The table reviewing circuitry may be responsive to a given data-consuming instruction to first review the dependency table for read-write dependencies and only second to review the dependency table for read-read dependencies.

Thus it is another object of the invention to capture the benefit of read-read data dependencies when corresponding read-write dependencies are too remote to be detected.

The foregoing and other objects and advantages of the invention will appear from the following description. In this description, references are made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

DETAILED DESCRIPTION OF THE INVENTION

ILP Processor Architecture Overview

Figure 1:
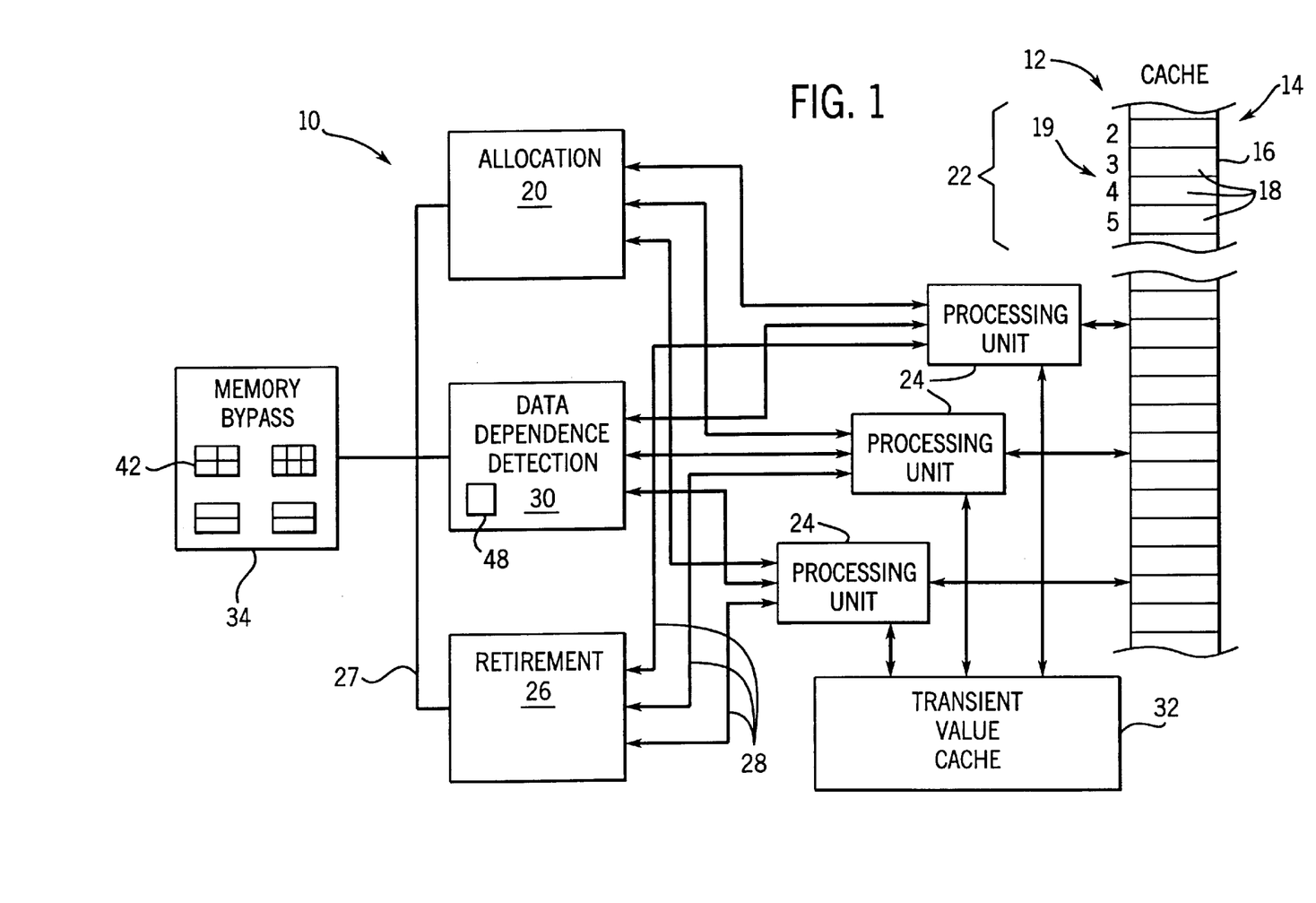
FIG. 1 is a simplified block diagram showing the architecture of a typical instruction level parallel processor having an allocation unit receiving instructions from memory and allocating them to multiple processing units and having a data speculation circuit for instructing the processing units to speculatively execute data dependent instructions and a retirement unit retiring the speculatively executed instructions and detecting mis-speculation, the processor also incorporating the memory bypass circuit of the present invention.

Referring now to FIG. 1, an instruction level parallel "ILP" processor 10 suitable for use with the present invention includes a memory 12 which may be a cache memory, well understood in the art, holding a portion 14 of a program 16 comprised of instructions 18 each having an address 19 uniquely identifying static instances of the instruction 18 of the program 16. The processor 10 may include various general-purpose registers as is understood in the art but not shown.

The ILP processor 10 includes an allocation circuit 20 which may read memory 12 to fetch the portion 14 of the program 16 encompassing multiple instructions of an instruction window 22. Generally, and as understood in the art, the allocation circuit 20 sends different ones of these instructions to different independent processing units 24 for execution.

The processing units 24 may independently communicate with the memory 12 for the purpose of obtaining data but generally do not modify portions of memory 12 that may also be read by other processing units 24 until instructed by the retirement circuit 26 as will be described. Thus, for example, an instruction which requires data to be obtained from memory 12 (e.g., a LOAD instruction) may be completely executed, however an instruction which stores data to memory (e.g., a STORE instruction) stops before the storage operation which may modify memory 12 used by other processing units 24. An instruction that has been executed as far as possible is termed "ready to issue".

The retirement circuit 26 receives signals from the processing units 24 indicating that their instructions are ready to issue. The retirement circuit 26 then retires the instruction in program order by causing the writing of any data values to memory 12 but only after the ready to issue instruction is checked for possible mis-speculation. Mis-speculation occurs in an instruction when it has been executed prematurely and erroneously. Thus, for example, a given instruction which is executed prior to the resolution of a preceding branch instructions, where the branch, when resolved, causes a branching around the given instructions, has been mis-speculated. Alternatively, a given instruction which loads a value from memory prior to a writing to that same memory location by a preceding instruction has also been mis-speculated. In this latter data dependence, the retirement circuit 26 checks for each given LOAD instruction whether there are any preceding STORE instructions within the instruction window 22 storing to the same memory address as the given LOAD instruction. If so, the ready to issue LOAD instruction is squashed. It must be reallocated by the allocation circuit 20 at a later time. This fact is communicated by signal lines 27 between the retirement circuit 26 and the allocation circuit 20.

The storing in memory 12 of results from ready to issue instructions that have not been squashed is then done by command from the retirement circuit 26 through signal lines 28.

Mis-speculation detection may be performed relatively quickly. However squashing mis-speculated instructions is relatively time consuming and normally requires that all instructions after the squashed instructions also be squashed. In the present invention, the retirement circuit 26 operating with the data dependence detection circuit 30 provides a mechanism to identify possible data dependencies in instructions. In a first use, the detected dependencies may be used to stall the particular instruction execution by the processing units 24 in certain cases of unambiguous data dependency or to speculatively execute these instructions when data dependency seems unlikely. The data dependence detection circuit may also be used to bypass cache or memory operations as will be described below.

Read-Write Data Dependence Detection

Generally, the data dependence detection circuit 30 identifies data-producing instructions, principally STORE instructions, that produce data to be written to memory 12, and data-consuming instructions, principally LOAD instruction, which receive data from memory 12, and links these instructions in a dependence prediction and naming table 48 in "read-write dependencies identified by common addresses of the STORE and LOAD instructions. A prediction value is included in each dependency entry and is updated every time a dependency between the instructions is detected. In a first use, this prediction value may be used in determining whether speculation should occur with regards to a given instruction within the instruction window 22. This prediction of the likelihood of data dependence between instructions is described in the above referenced co-pending application.

Memory Bypassing: Load and Store Instructions

This dependence prediction and naming table 48 and this prediction value are also used in the present invention to establish a link between two dependent instructions so that memory operation (e.g., storing or loading) maybe by-passed in certain situations. The additional information needed by the memory bypassing operations and its associated logic circuitry is provided by a memory by-pass circuit 34 incorporating logic circuitry and registers configured as tables for temporary data storage as will now be described.

Figure 2:
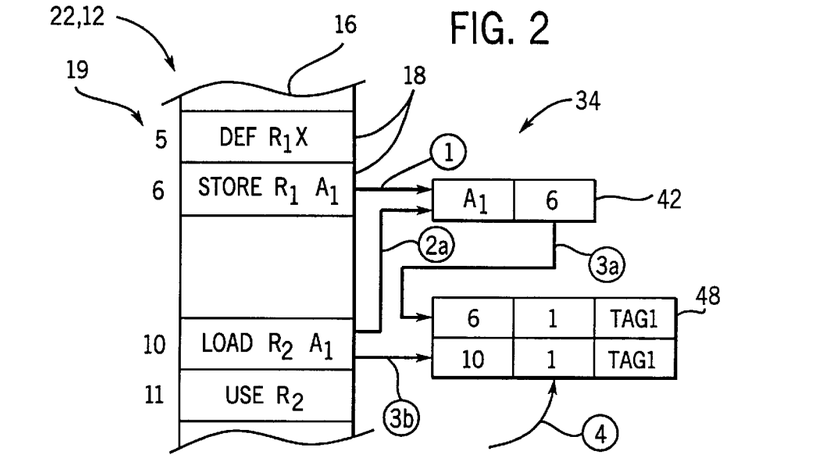
FIG. 2 is a schematic representation of instructions in a program showing the operation of the memory bypass circuit in creating a dependence detection table and a dependence prediction and naming table to link data-producing and data-consuming instructions.

Referring to FIG. 2, an example program 16 provides at memory addresses 5, 6, 10 and 11: a data-defining instruction, a data-producing instruction, a data-consuming instruction, and a data-using instruction. The data-defining instruction at memory address 5 may be any number of common computer operations that receive operands and produce a data value. This is represented generically by the instruction DEF ("defined") followed by operands of $R_1$ indicating a register to which the output value is written and value X indicating the actual value has been written to the register $R_1$. In practice the value of X would be implicit in the operations but it is displayed for the purpose of clarity in this example.

At memory address 6, a STORE instruction produces data for storage in the memory 12 moving the contents of $R_1$ (i.e., X) to a memory address $A_1$.

At subsequent memory location 10, after arbitrary intervening instructions, is a LOAD or data-consuming instruction which, as depicted, reads the contents of memory address $A_1$ into register $R_2$. In this example it is assumed that the intervening instructions do not include relevant data-defining or producing instructions, however, they may include branch instructions branching around subsequent memory addresses 10 and 11.

At memory address 11, the data retrieved by the instruction of memory address 10 is used, as indicated generically by a USE instructions which uses the value of $R_2$ in some arbitrary operation.

Figure 4:
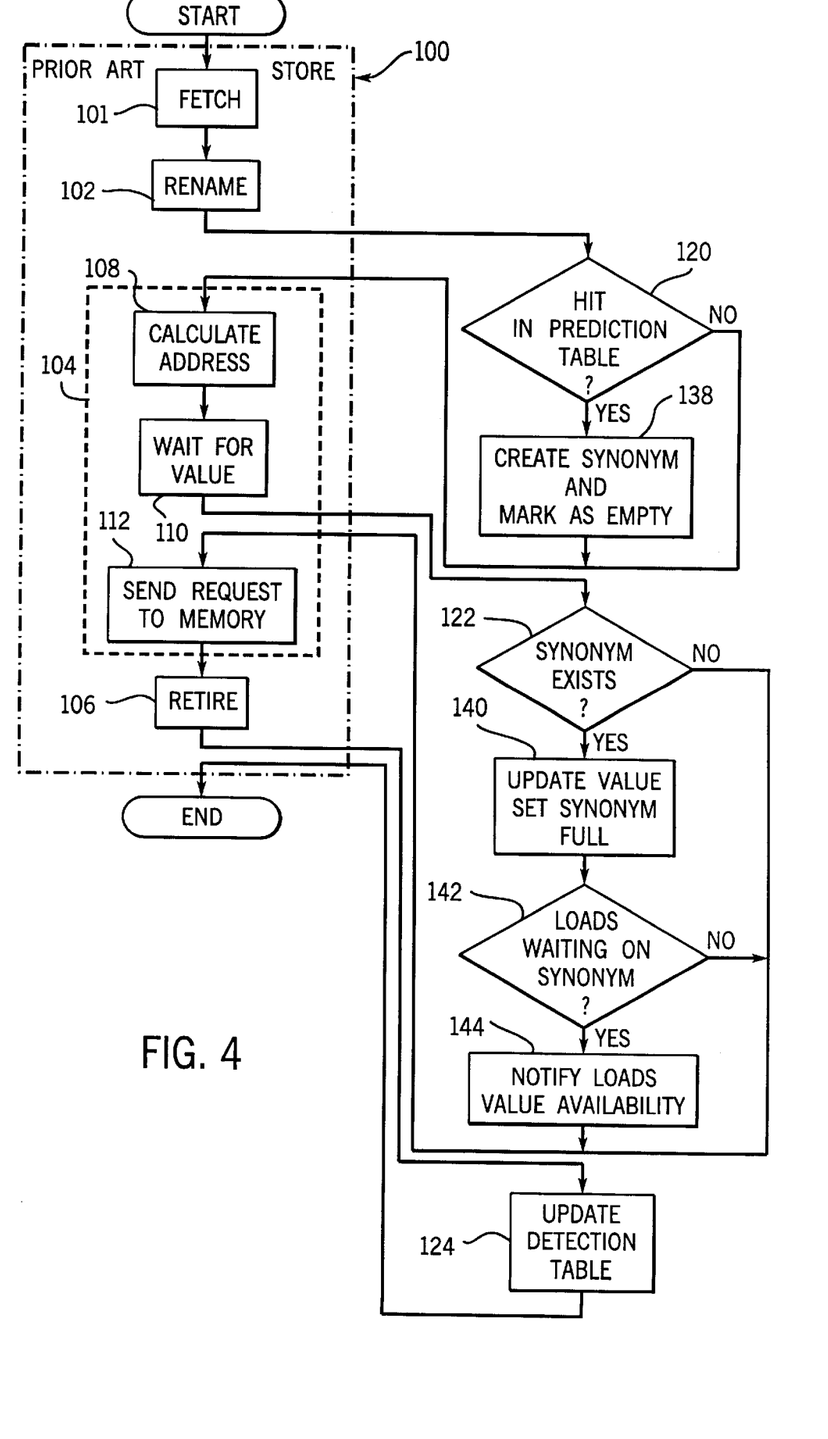
FIG. 4 is a flowchart describing the operation of the memory bypass circuit when a STORE instruction is encountered in examples of FIG. 3.
Figure 6:
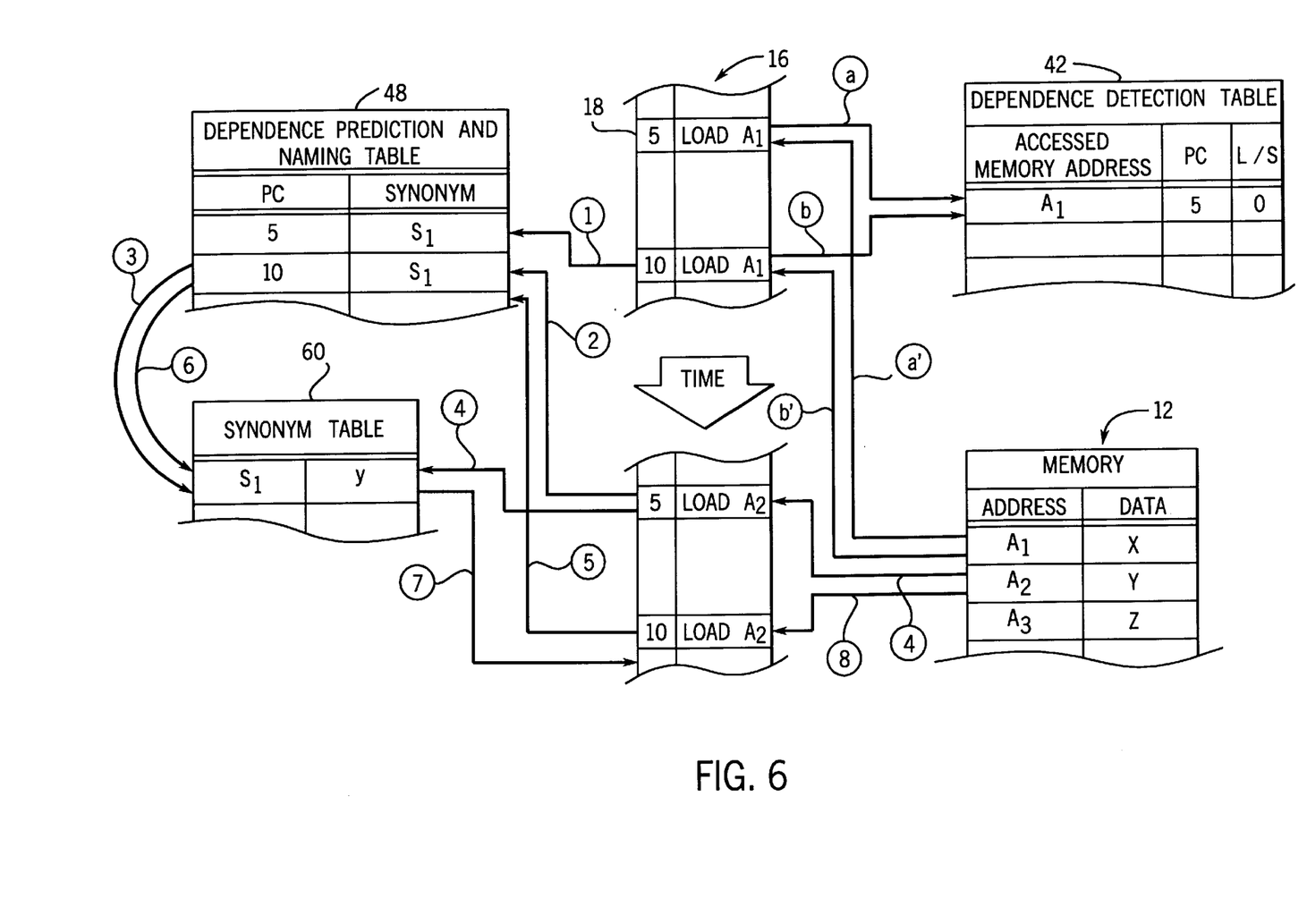
FIG. 6 is a figure similar to that of FIGS. 2 and 3 showing the operation of the memory bypass circuit in creating a dependence detection table and a dependence prediction and naming table to link two data-consuming instructions.

Referring now to FIGS. 4 and 6, instructions 18 may be executed by the processor 10 according to the prior art steps 100 including a fetch step 101 in which the instruction enters the instruction window 22, a rename step 102 in which source register dependencies are discovered as is well known in the art and renamed, and in which input values are awaited, and execute step 104 in which the instruction is generally executed as will differ for four different instructions, a retire step 106 in which the retirement circuit 26 (shown in FIG. 1) retires the instruction also as is generally understood in the art.

As mentioned, the execution block 104 will generally differ for different instructions. As shown in FIG. 4 for a STORE instruction, a first block 108 of the execution block 104 will calculate the address at which the store will be performed. At process block 110, the input value to be stored is awaited. As is understood in the art, the sequence of calculating the address and waiting for the input are arbitrary and may be reversed. At process block 112, a request is sent to memory for the STORE operation, (e.g. for a writing of the value to memory at the address calculated at block 108).

Figure 5:
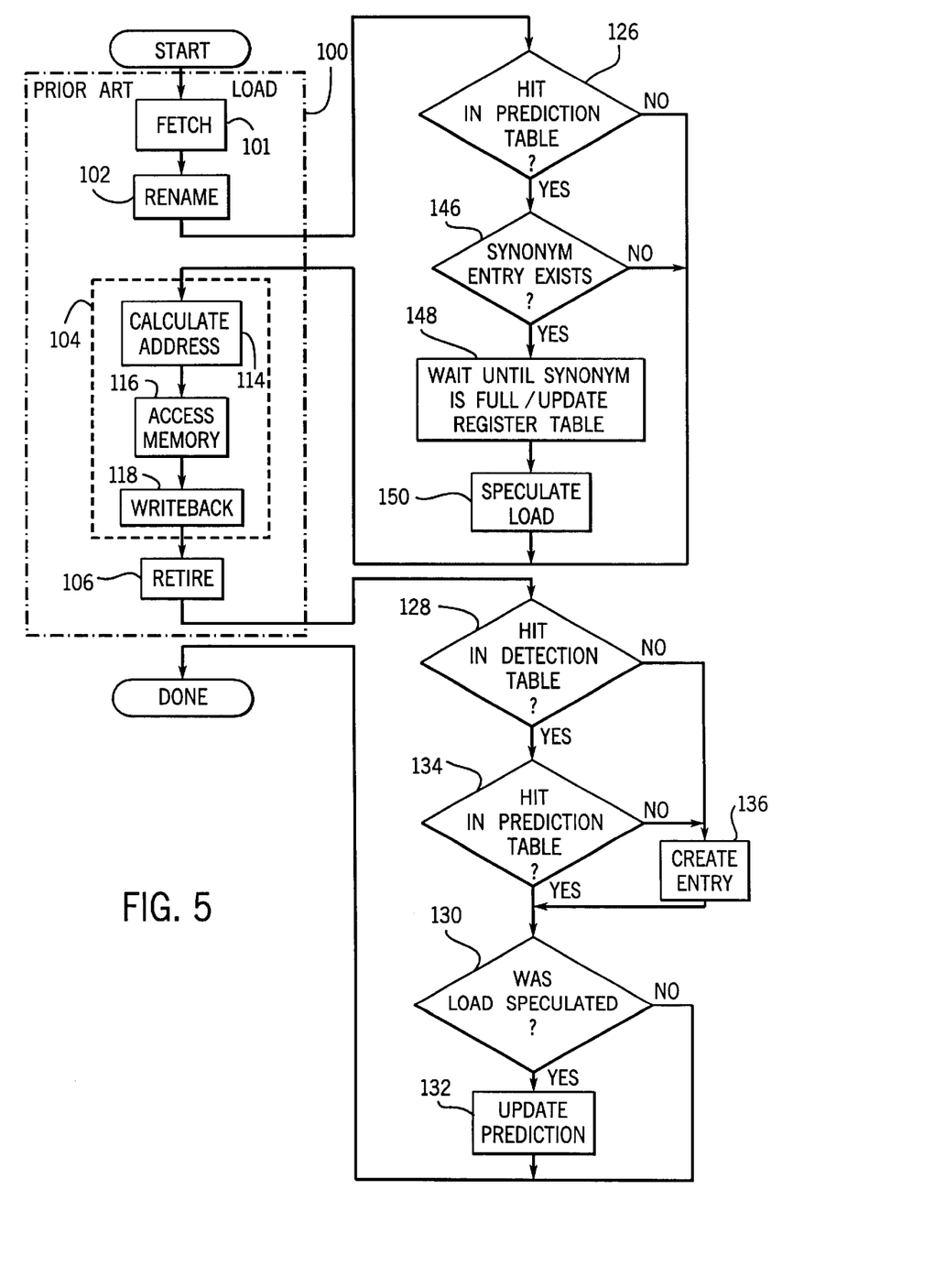
FIG. 5 is a flowchart similar to FIG. 4 showing the operation of the memory bypass circuit when receiving a LOAD instruction in examples of FIG. 3.

Referring now to FIG. 5, the execution block 104 for a LOAD instruction will also include an address calculation 114, this time for the address of the data to be loaded followed by an access of memory 116 and a write back 118 in which the load instruction propagates the value returned from memory to all subsequent instructions that need it and to the register file of the retirement circuit 26. The present invention adds additional steps to these prior art sequences as will now be described.

Referring now to FIGS. 2 and 4, when the STORE instructions at memory address 6 is first encountered, the dependence detection table 42 and dependence prediction and naming table 48 will be empty. As shown by decision block 120, the prediction table will be investigated according to the address 6 of the STORE instruction and no entry will be found and accordingly, the program proceeds to process block 108 for execution of the STORE instruction. When the STORE instruction is notified that its value is available after process block 110, a synonym table 60 (shown in FIG. 3) which is also initially empty is investigated as indicated by process block 122. If no synonyms exist, the program proceeds to process block 112 as normal.

After the STORE instruction is retired at process block 106, the program proceeds to process block 124. The dependence detection table 42 is updated to create an entry holding (1) the address $A_1$ and (2) the program address of the instruction (i.e., the address 19 of the STORE instruction) in this case 6. The entry created is shown as one row in a dependence detection table 42. As will be understood in the art, the entry of dependence detection table 42 may also include a valid bit (not shown) indicating that a valid entry is placed in the row according to methods well understood in the art. The step of creating the entry in the dependence detection table 42 is shown by the arrow labeled in FIG. 2 with a circled 1, the circle distinguishing numbered steps of the process from other identifying numbers.

Referring now to FIGS. 2 and 5, when a succeeding LOAD instruction at memory address 10 is encountered, then following process block 102, the program proceeds to decision block 126. Again because the dependence prediction and naming table 48 is empty, at least at this time, the program returns to calculate the address for the load to process block 114.

When the LOAD instruction is ready to retire at process block 106, the program proceeds to process block 128 and the dependence detection table 42 is investigated as indicated by arrow 2a. At this time, the address A1 of the LOAD instruction is compared to the addresses held in the dependence detection table 42 and if, as will often be the case there is no entry for that address, then as indicated by process block 136 an entry is created in the detection table 42 and the execution of the program proceeds to process block 130 where it is determined whether the load was speculated, that is, executed out of order. If so, a prediction value in the prediction table 41 as will be described below, is updated as indicated by process block 132, either to increase its value if the speculated load was correctly speculated or decrease its value if the speculated load was incorrectly speculated and must be squashed. If the load was not speculated, then the load instruction is complete and block 132 is bypassed.

Returning again to decision block 128 in the present example as shown in FIG. 2, a hit will be found in the dependence detection table 42, that is the LOAD instruction will find its address A1 and a link to the STORE instruction at address 6. Accordingly at decision block 128, the program branches to process block 134 where the prediction table is probed for an entry that links the STORE and LOAD instructions. If such an entry exists, the program proceeds to decision block 130 as described before and the prediction value of the dependence prediction and naming table 48 is updated as will be described below. In the present example, however, as indicated by arrow 3a, initially there is no entry in the dependence prediction and naming table 48 and hence no prediction so at process block 136, an entry is created in the dependence prediction and naming table 48 as indicated by arrow 3b of FIG. 2. The entry as shown in FIG. 2 is depicted as a row in a dependence prediction and naming table 48 including (1) the program address of the STORE instruction found in the dependence detection table 42, (2) a prediction value which is initially zero and (3) a common tag here designated as "TAG 1" and realized as a binary value within the memory bypass circuitry 34. The TAG 1 value serves to link the entry of this row to a second row, the pair of which will be termed a "dependency".

The second row includes (1) the program counter value of the LOAD instruction using the common address value $A_1$ (in this value 10), (2) a prediction value again initially zero, and (3) the common tag, TAG 1. The creation of the second row is shown by arrow 3b. The dependency formed from these two rows indicates a possible but unconfirmed data dependence between the STORE instruction at address 6 and the LOAD instruction at address 10. The dependency is not certain because an intervening branch instruction, for example, may cause a different STORE instruction to write to address $A_1$ prior to the reading of that address by the LOAD instruction of address 10.

Referring again to process block 130 and 132, as the program 16 is further executed, the prediction value of this dependency may be incremented by the data dependence detection circuit 30 as indicated by arrow 4 every time there is a successful speculation with respect to the LOAD instruction of address 10. Generally, a given threshold of prediction value (in the preferred embodiment, a threshold value of one) is used to determine whether the two instructions of dependency are likely data dependent. This threshold may be adjusted empirically for best performance.

Figure 3:
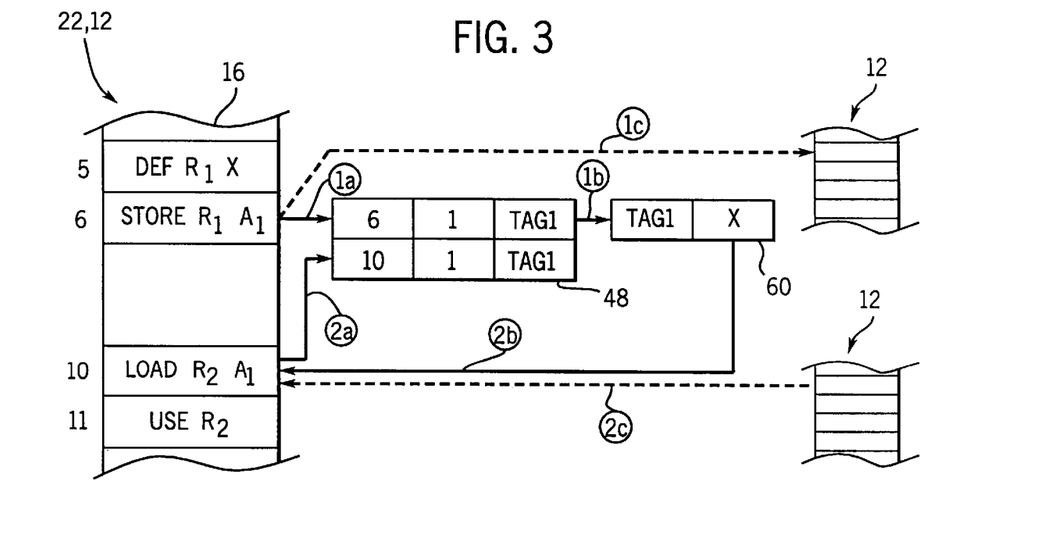
FIG. 3 is a figure similar to that of FIG. 2 showing the further creation of a synonym table used to communicate data directly between data-producing and data-consuming instructions.

Referring now to FIGS. 3 and 4, on a subsequent execution of the program 16, the STORE instruction at address 6 causes the data dependence detection circuit 30 to investigate the prediction table per process block 120 as shown by arrow 1a and decision block 120. In this case, an entry is found in the dependence prediction and naming table 48 having the program address of the STORE instruction and therefore at process block 138, a synonym is created in synonym 60. The synonym table 60 includes at this time only the common tag associated with the STORE instruction (i.e., TAG 1).

Referring still to FIG. 4, at a later point, the program proceeds to decision block 122 where it checks to see whether this STORE is allocated a synonym. In this example, a synonym has been allocated and accordingly the program proceeds to process block 140 where the value for the STORE is written into the synonym table and it is marked as full so that loads that come later will not wait. In this case, the value written is X. Note that the value X is simply a value and not a register name or a memory address. The first operation of creating the entry in the synonym table is shown by arrow 1b. The marking as full is indicated in the example simply by a value of X being provided.

Next at decision block 142, the STORE instruction checks to see whether there are LOADS waiting on the synonym. If not, the program proceeds to process block 112 and the STORE operation is completed. If so, however, at process block 144, the loads are notified that the value is available. This notification is reflected at process blocks 148 and 150 of FIG. 5 to be now described.

Referring now to FIGS. 3, and 5 at the occurrence of the subsequent LOAD instruction at address 10, the LOAD probes the dependence prediction and naming table 48 as indicated by arrow 2a per decision block 126. In this case, a prediction value will be present and so the program proceeds to process block 146 and the tag from the prediction table is used to locate the appropriate synonym as indicated by decision block 146. If no synonym exists, the LOAD proceeds to execute at process blocks 104, but if a synonym does exist as per the present example, the program proceeds to process 148 and the LOAD waits until the synonym is marked full. At this time it will use the value recorded. If in the meantime the allocation circuit 20 notifies the LOAD that memory 12 has replied with the value, processing aborts (not shown in FIG. 4). The notification from the memory 12 is indicated by arrow 2c.

Assuming that a synonym is marked 'full' prior to the allocation circuit 20 notifying the LOAD that memory 12 has replied with a value, the program proceeds to process block 150 and the LOAD is speculated by using the value X obtained from the synonym table 60 as indicated by arrow 2b. The value of X is thus used to speculatively execute the LOAD instruction per process block 150 avoiding the delay in the completion of the previous STORE 1c and/or the current load memory operation. The actual memory operation of the LOAD instruction will be performed ultimately, however, as indicated by arrow 2c and its value compared to the value X to detect whether there is a mis-speculation. Thus the prediction of the dependence prediction and naming table 48 need not be perfect.

As the program continues to execute the LOAD instruction at decision block 128, a hit will be found in the dependence detection table 42 and at decision block 134, a hit will be found in the prediction table. In this case at decision block 130, the LOAD was speculatively executed so at process block 132, the prediction value will be updated by incrementing the prediction if the instruction was not mis-speculated as known at the time of retirement or decrementing the prediction value if a mis-speculation occurred as has been described earlier.

Read-Read Data Dependence Detection

Under some circumstances, the read-write dependency between instructions cannot be detected because the corresponding STORE and LOAD are too far apart in the execution stream or there may be no STORE. In these cases, a read-read dependency between two LOAD instructions reading the same memory value may still be detected. The above described mechanism for detecting and exploiting read-write dependencies can be used for detecting and exploiting read-read dependencies as will be now described.

Referring to FIG. 1, in this case, generally data dependence detection circuit 30 identifies data-consuming instructions, principally LOAD instructions, that read data from common addresses of memory 12 and links these instructions in a dependence prediction and naming table 48 in "read-read dependencies identified by common addresses of the LOAD instructions. A prediction value is included in each dependency entry and is updated every time a dependency between the instructions is detected. In a first use, this prediction value may be used in determining whether speculation should occur with regards to a given instruction within the instruction window 22.

Sequential LOAD Instructions

As before, this dependence prediction and naming table 48 and this prediction value are also used in the present invention to establish a link between two dependent instructions so that memory operations for load instructions may be by-passed in certain situations. The structure used for this operation is analogous to that described above with minor differences noted below.

Referring to FIG. 6, an example program 16 provides at memory addresses 5 and 10 data-consuming instructions (e.g., a LOAD instruction) reading from a common memory address $A_1$. Memory address $A_1$ holds a value X. At subsequent memory location 10, after arbitrary intervening instructions, is a second data consuming instruction also reading the contents of memory address $A_1$. In this example, it is assumed that the intervening instructions do not include relevant data-producing instructions writing to address $A_1$, however, such instructions do not defeat the utility of the present invention.

Referring still to FIG. 6, when the LOAD instructions at memory address 5 is first encountered, a read-write dependency is evaluated by investigating dependence detection table 42. If no preceding STORE or LOAD instruction has been recorded at the same address (as described above), the LOAD is recorded as such as indicated by arrow (a).

Checking for preceding STORE instructions ensures that read-write dependence (where all memory accesses may be avoided) is given preference to read-read dependence, where the first LOAD instruction must actually perform a memory access.

The ability to determine whether an entry in the dependence detection table 42 is a STORE is provided, by an additional Load/Store (L/S) bit in the dependence detection table 42 which is set if the instruction is a STORE and reset if the instruction is a LOAD. Checking for a preceding LOAD instruction ensures the oldest LOAD is recorded as producer of the value and to guarantee that only a single LOAD or STORE is recorded in the dependence detection table 42 for a given address.

When the succeeding LOAD instruction at memory address 10 is encountered, it again accesses the dependence detection table 42, as shown by arrow (b) and detects a read-read dependency based on the common address $A_1$. Upon this detection, two entries are made in the dependence prediction and naming table 48 indicating the addresses (program counter values) for the two dependent LOAD instructions and a common linking synonym $S_1$. The operation is indicated by arrow (1). An entry is made in the dependence detection table 42 only if no preceding STORE has been recorded for the same address, as indicated by the dependence prediction and naming table 48.

When a later instance of the LOAD at address 5 is encountered, the dependence prediction and naming table 48 is queried using the program counter value 5 and the synonym $S_1$ linking the LOAD instruction to a later LOAD instruction is discovered. Note that this LOAD instruction points to address $A_2$ not $A_1$ as before, indicating that the present technique establishes dependencies that survive dynamic changes in actual addresses of the LOAD instructions and that the technique does not require completion of the calculation of the address be begun. As indicated by arrow (3), assuming that dependence is predicted, an entry is made in the synonym table 60. Initially this entry is empty, but when the LOAD completes, the value of Y is placed in the synonym table 60 as indicated by arrow (4).

When the LOAD at address 10 is again encountered, the program counter is again used to access the dependence prediction and naming table 48. If an entry and suitable prediction value is encountered, then the synonym table 60 is checked for the value Y which per arrow (7) is forwarded to the consuming instructions. Eventually, when the LOAD instructions at address 10 calculates its address and completes its memory access per arrow (8), the value read from memory can be used to verify whether the synonym table 60 provided the correct value. If the values match, speculation was successful, if not corrective action is taken per normal speculative processing techniques.

The above description has been that of a preferred embodiment of the present invention. It will occur to those that practice the art that many modifications may be made without departing from the spirit and scope of the invention. For example, it will be understood that more complex prediction methods can be adopted that go beyond the simple tallying of mis-speculation and correct speculation described herein. Further, it will be understood that the division of the information into the relative tables is arbitrary and the dependence prediction and naming table 48, the dependence detection table 42 and the synonym table 60 may be generally considered as part of a dependency table. In order to apprise the public of the various embodiments that may fall within the scope of the invention the following claims are made.

We claim:

1. In an electronic processor executing data-producing instructions, producing data to be loaded into a memory, and data-consuming instructions, reading data from the memory, a memory bypass circuit comprising:

a) a dependency table linking in read-read dependencies first data-consuming instructions to second data-consuming instruction according to a probability that both data consuming instructions read data produced by a same data-producing instruction;

b) a storage register storing the data received by a first data consuming instruction identified to a read-read dependency of the dependency table the data being that data transmitted from the memory in response to execution of the first data consuming instruction; and c) table reviewing circuitry responsive to execution of a second data-consuming instruction to review the dependency table and when the second data-consuming instruction is part of a read-read dependency with the first data consuming instruction, reading the data for that read-read dependency from the storage register.

2. The memory bypass circuit of claim 1 wherein the dependency table holds a prediction value associated with each read-read dependency and wherein the table reviewing circuitry responds to the execution of the second data-consuming instruction that is part of a read-read dependency by reading the data for that read-read dependency from the storage register only if the prediction value is above a predetermined threshold value.

3. The memory bypass circuit of claim 2 including a read-read dependence detection circuit detecting that a second data consuming instruction is dependent on a first data consuming instruction based on a common address in memory from which data of the data consuming instruction may be read.

4. The memory bypass circuit of claim 1 including memory access circuitry accessing the memory in response to the execution of the second data-consuming instruction and comparing data received from the memory to the data from the storage register to detect mis-speculation and to use the data from the memory rather than the data from the storage register if the data from the memory is not the same as the data from the storage register.

5. The memory bypass circuit of claim 1 wherein:

d) the dependency table further links in read-write dependencies particular data-producing instructions to particular data-consuming instructions according to a probability that the data-producing instruction produces data used by the data-consuming instruction;

e) the storage register further stores the data produced by the data-producing instruction identified to the read-write dependency of the dependency table; and f) the table reviewing circuitry further is responsive to a given data-consuming instruction to review the dependency table and when the given data-consuming instruction is part of a read-write dependency, reading the data for that dependency from the storage register.

6. The memory bypass circuit of claim 5 wherein the table reviewing circuitry is responsive to a given data-consuming instruction to first review the dependency table for read-write dependencies and to use data in the storage register received from a first data producing instruction only if a read-write dependency exists and if a read-write dependency does not exist, then to review the dependency table for read-read dependencies and to use data in the storage register received from a first data consuming instruction only if a read-read dependency exists.

7. The memory bypass circuit of claim 5 wherein the dependency table holds a prediction value associated with each read-write dependency and wherein the table reviewing circuitry responds to the given data-consuming instruction that is part of a read-write dependency by reading the data for that read-write dependency from the storage register only if the prediction value is above a predetermined threshold value.

8. The memory bypass circuit of claim 7 including a dependence detection circuit detecting that a data consuming instruction is dependent on a data producing instruction based on common address in memory to which data of the data producing instruction may be written and from which data of the data consuming instruction may be read.

\* \* \* \* \*

UNITED STATES PATENT AND TRADEMARK OFFICE
CERTIFICATE OF CORRECTION

PATENT NO. : 6,658,554 B1
DATED : December 2, 2003
INVENTOR(S) : Moshovos et al.

It is certified that error appears in the above-identified patent and that said Letters Patent is hereby corrected as shown below:

<u>Title page,</u>
Item [73], Assignee, should read:
-- Wisconsin Alumni Research Foundation, Madison, Wisconsin --

Signed and Sealed this

Eighteenth Day of May, 2004

JON W. DUDAS
*Acting Director of the United States Patent and Trademark Office*